W. GEAHR.
Manure Fork.
No. 98,487. Patented Jan. 4, 1870.
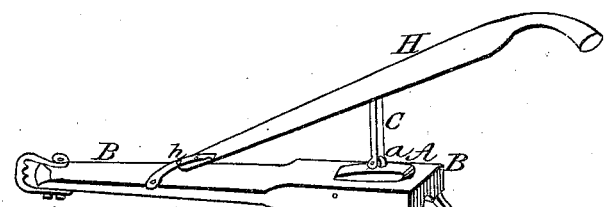
Fig. 1.
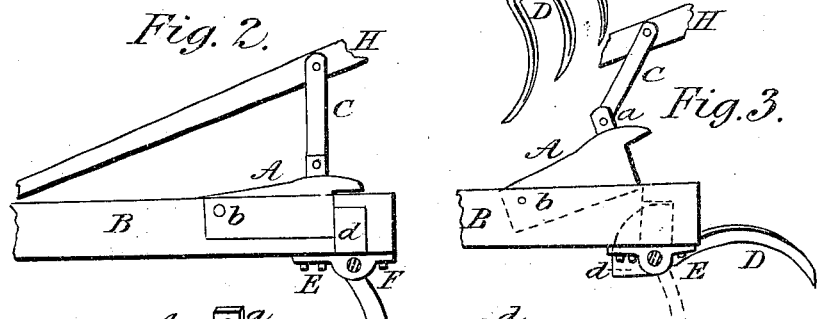
Fig. 2. Fig. 3.
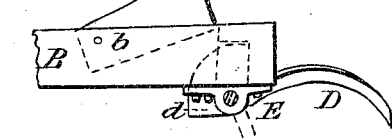
Fig. 4.
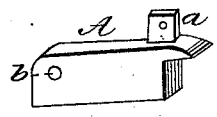
Fig. 5.
Witnesses:
Wm Barjtler
Roland Diller
Inventor:
William Geahr

United States Patent Office.

WILLIAM GEAHR, OF EAST EARL TOWNSHIP, PENNSYLVANIA, ASSIGNOR TO HIMSELF AND GEORGE DUCHMAN, OF SAME PLACE.

Letters Patent No. 98,487, dated January 4, 1870.

IMPROVEMENT IN MANURE-DRAG.

The Schedule referred to in these Letters Patent and making part of the same

I, WILLIAM GEAHR, of East Earl township, in the county of Lancaster, and State of Pennsylvania, have invented certain Improvements on a Manure-Drag, of which the following is a specification.

The object of my invention is to simplify, reduce the weight and price, to dispense with one of the handles and extra levers, and produce a strong, cheap, and efficient implement for farmers generally.

The accompanying drawings clearly show and illustrate the construction and operation.

Figure 1 is a perspective view.

Figures 2 and 3 illustrate the action of Figures 4 and 5, shown detached in perspective.

B shows a straight beam, with a clevis in front, and an oblong mortise at the hind end. To this beam a single handle, H, is hinged at $h$.

Below, on the rear end of the beam, is a pair of boxes, E, for bearings for the three-pronged hook D, with a central prolongation, $d$. This hook swings freely in the boxes, and is held firmly in a vertical position by a block, A, which has an overlapping lip, and is set into the oblong slot in the beam B, and secured by a pivot-bolt, $b$. This block, when in place, buts against the prolonged head $d$ of the hook D, and stays it. This block A has a lug or its equivalent, to which a bar, C, is jointed, by which it is connected by a pivot to the handle H. By simply raising the handle, the block A is raised in the slot, and the lug $d$ of the hook released, which allows the hook to swing back, as shown by fig. 3, and dislodge its contents.

I am aware that the lug on the hook, and a stop combined with a lever, separate and apart from the handle, are claimed, the two handles being rigidly fixed. Such an arrangement I do not claim.

I am not aware, however, of any of the numerous manure-drags, in which the single-jointed handle also constitutes the lifting-lever, by which arrangement much material is saved, lessening the expense and weight, without lessening the strength or utility; hence I deem this an improvement on hooks of this kind.

What I claim as my invention, is—

The arrangement and combination of the single hinged handle H, undivided beam B, with the connecting-bar C, hinged to the handle and block A, to stay or release the hook D, in the manner and for the purpose specified.

WILLIAM GEAHR.

Witnesses:
 WILLIAM BURSTLER,
 ROLAND DILLER.